(12) United States Patent  
Kim

(10) Patent No.: US 6,991,284 B2  
(45) Date of Patent: Jan. 31, 2006

(54) SUB-FRAME MOUNTING STRUCTURE FOR A VEHICLE

(75) Inventor: Ki-Chang Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 80 days.

(21) Appl. No.: 10/749,253

(22) Filed: Dec. 30, 2003

(65) Prior Publication Data

US 2005/0062316 A1    Mar. 24, 2005

(30) Foreign Application Priority Data

Jul. 30, 2003    (KR)    ........................ 10-2003-0052849

(51) Int. Cl.  
*B62D 21/00*    (2006.01)

(52) U.S. Cl. .................... 296/204; 296/203.02; 296/29

(58) Field of Classification Search ........... 296/193.05, 296/193.09, 193.04, 204, 203.02, 203, 29, 296/30; 280/124.09, 781, 797, 798  
See application file for complete search history.

(56) References Cited

U.S. PATENT DOCUMENTS

| 6,349,953 B1 * | 2/2002 | Yoshihira et al. ........... 296/204 |
| 6,375,221 B1 * | 4/2002 | Kudou ....................... 280/788 |
| 6,679,523 B2 * | 1/2004 | Yamamoto et al. ......... 296/204 |

FOREIGN PATENT DOCUMENTS

JP    5-10164    1/1993

* cited by examiner

*Primary Examiner*—Jason Morrow  
(74) *Attorney, Agent, or Firm*—Morgan Lewis & Bockius LLP

(57) ABSTRACT

A sub-frame mounting structure for a vehicle includes a front side member forming a first closed section therein and having a depressed portion at a bottom side thereof. A separating plate covers the upper side of the depressed portion in the front side member and forms a second closed section with the depressed portion in the first closed section. A mounting bolt, with a head portion disposed, by welding, between the separating plate and the bottom side of the front side member, and a shank portion protruding out from the bottom side of the front side member.

8 Claims, 5 Drawing Sheets

SUB-FRAME MOUNTING STRUCTURE FOR A VEHICLE

CROSS-REFERENCE TO RELATED APPLICATIONS

This application claims priority to Korean Application No. 10-2003-0052849, filed on Jul. 30, 2003, the disclosure of which is incorporated fully herein by reference.

FIELD OF THE INVENTION

Generally, the present invention relates to a vehicle sub-frame assembly. More particularly the sub-frame assembly includes a mounting structure for coupling a mid-part of a side of the sub-frame to a front side member.

BACKGROUND OF THE INVENTION

Generally, a vehicle sub-frame is U-shaped and includes two branches or side parts. The two branches or side parts of the U-shaped sub-frame are typically aligned in parallel at one side of the vehicle. Each end of the side parts is mounted to a front side member, respectively, and a connecting part of each side part is located at a back side of the engine compartment. Furthermore, a mid-part of the side part of the sub-frame is coupled to the front side member via a center support.

Ideally, a coupling portion between the center support and front side member would provide relatively high rigidity compared with that of other mounting parts of the sub-frame. This high rigidity would help reduce noise that occur while a vehicle makes a sharp turn or a sudden stop.

SUMMARY OF THE INVENTION

According to an embodiment of the present invention a vehicle sub-frame mounting structure is adapted to facilitate assembly of the sub-frame to a vehicle body and to provide sufficient rigidity at a coupling portion located between a center support and a front side member.

In a preferred embodiment of the present invention, a sub-frame mounting structure comprises a front side member forming a first closed section and having a depressed portion at a bottom side. A separating plate covers an upper side of the depressed portion in the front side member and forms a second closed section with the depressed portion in the first closed section. A mounting bolt includes a head portion disposed, by welding, between the separating plate and the bottom side of the front side member and a shank portion protrudes out from the bottom side of the front side member.

BRIEF DESCRIPTION OF THE DRAWINGS

For a better understanding of the nature and objects of the present invention, reference should be made to the following detailed description read in conjunction with the accompanying drawings, in which.

DETAILED DESCRIPTION OF PREFERRED EMBODIMENTS

Figure 1:
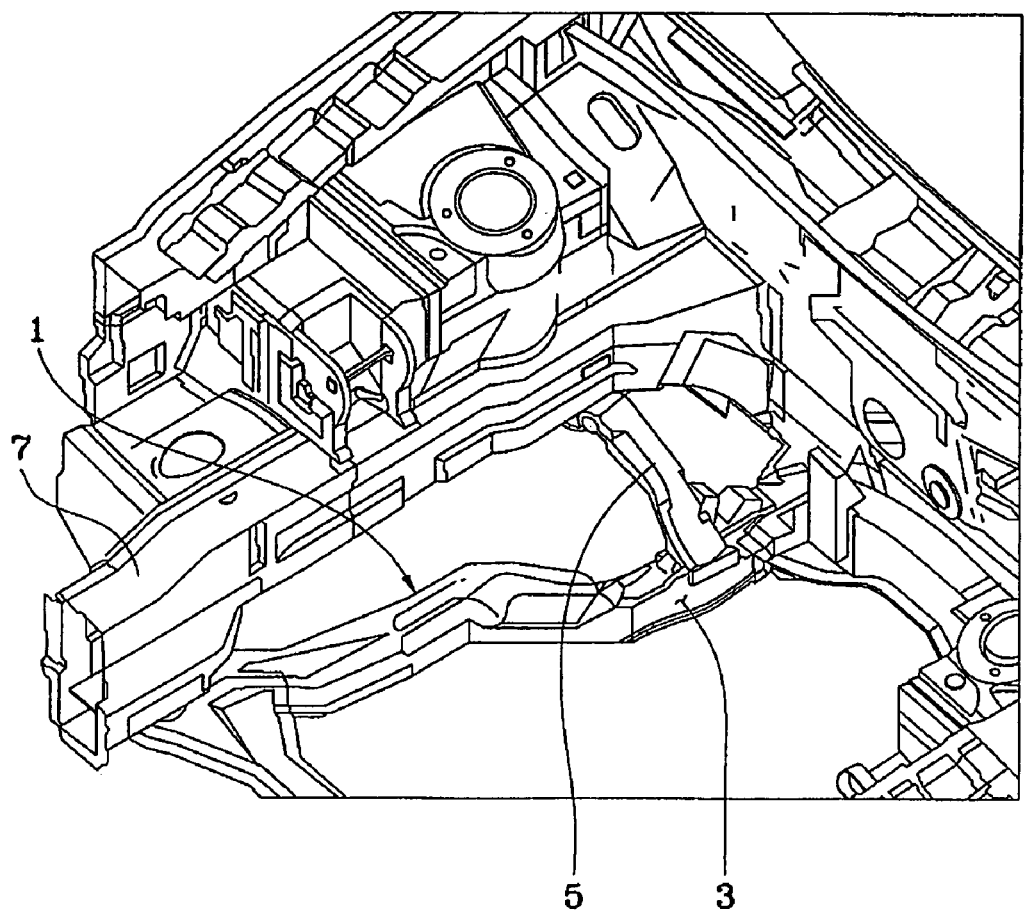
FIG. 1 is a perspective outer view of a sub-frame mounting structure for a vehicle according to an embodiment of the present invention.
Figure 2:
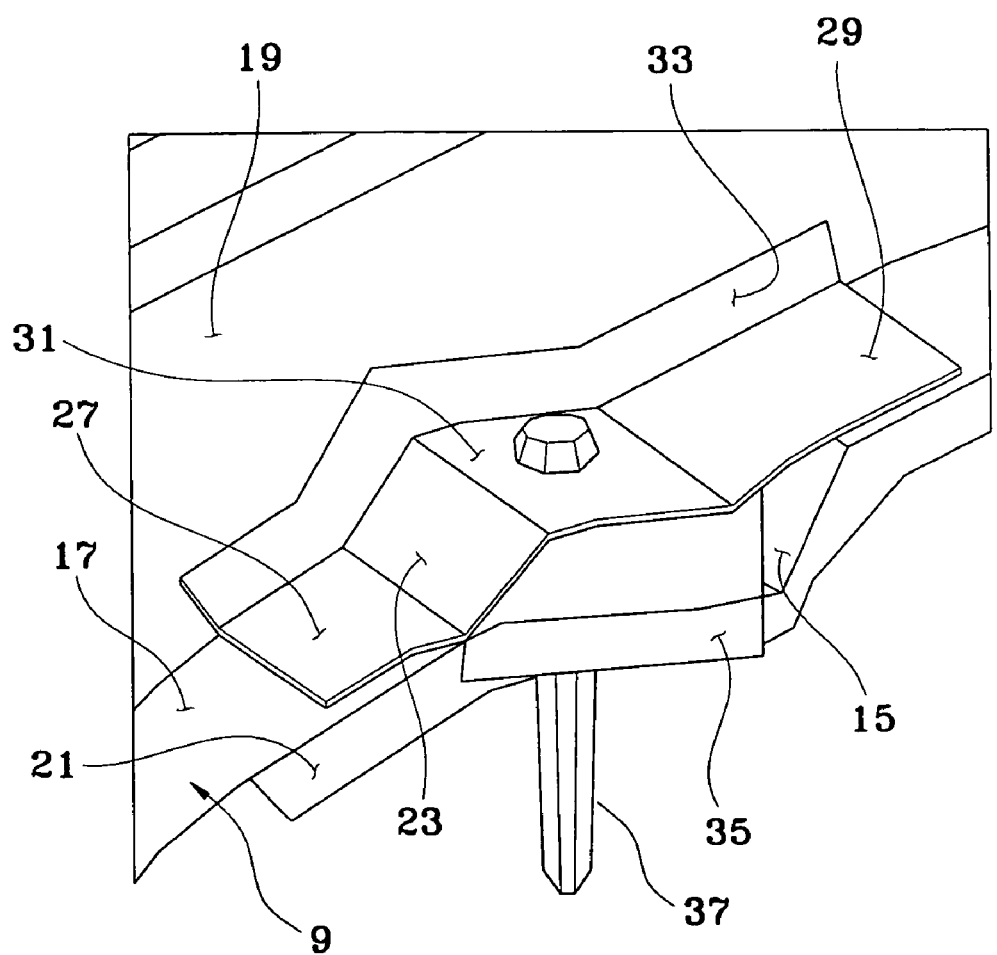
FIG. 2 shows a mounting bolt and a separate plate coupled to a first side member according to an embodiment of the present invention.
Figure 3:
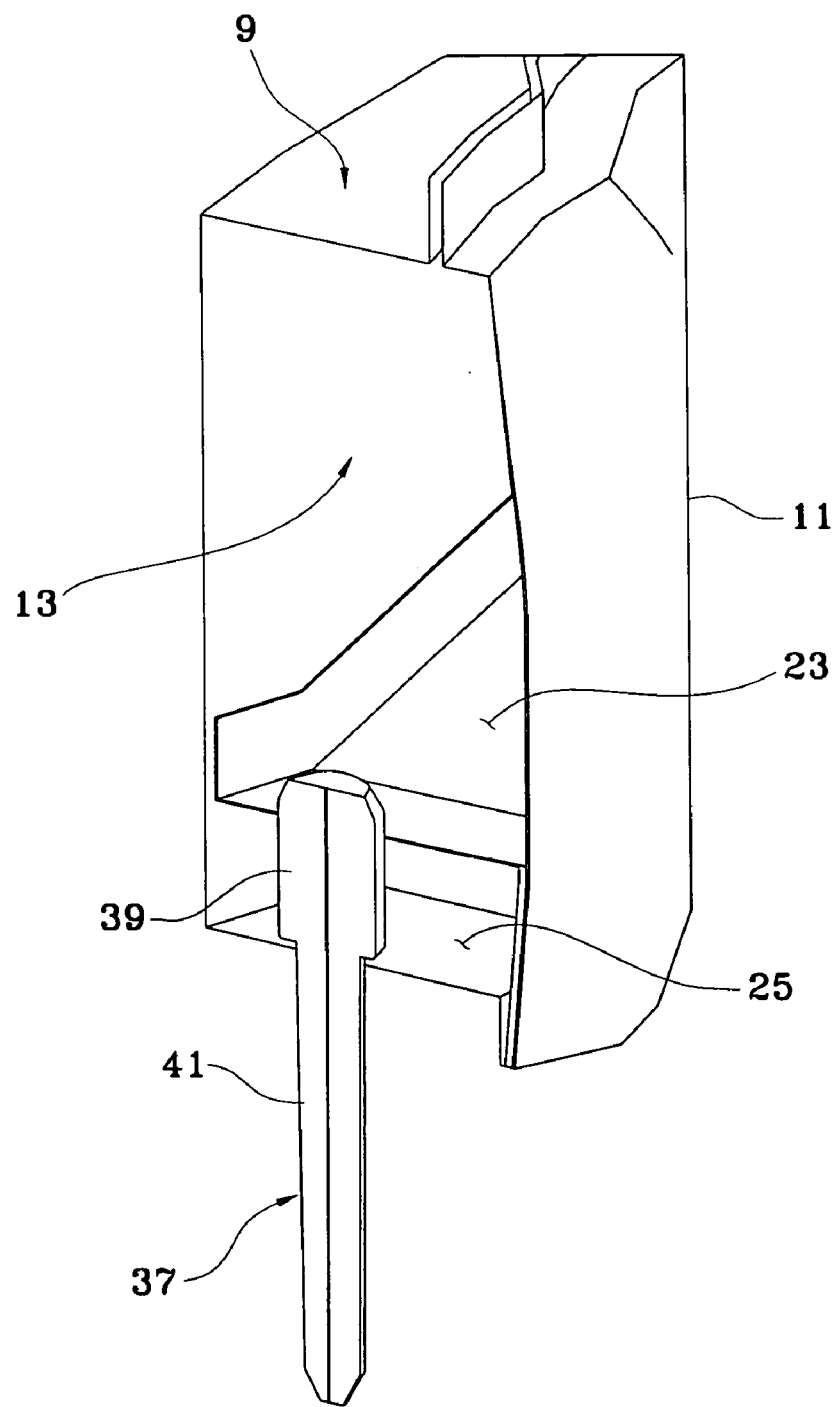
FIG. 3 is a cross-sectional view of an installation part between a mounting bolt and a separate plate of a front side member according to an embodiment of the present invention.

According to FIG. 1, a mid-part of a side part 3 of a sub-frame 1 is mounted to a bottom side of a front side member 7 via a center support 5. FIGS. 2 and 3 show the front side member 7 constitutes a first side member 9 and a second side member 11. The front side member 7 forms a first closed section 13 and a depressed portion 15 at a bottom side thereof. The first side member 9 comprises a bottom plate 17, a vertical plate 19, and a flange 21. The bottom plate 17 has the depressed portion 15 locally downwardly depressed. The vertical plate 19 upwardly connects from one side of the bottom plate 17, while the flange 21 downwardly connects from the other side of the bottom plate 17. The second side member 11 couples to the first side member 9 along a longitudinal direction of the vehicle and forms the first closed section 13 with the first side member 9. A separate plate 23 covers the upper side of the depressed portion 15 in the front side member 7 and forms a second closed section 25 with the depressed portion 15 in the first closed section 13.

The separate plate 23 includes a front portion 27 and a rear portion 29, respectively, and is coupled, for example by welding to the front and rear side of the bottom plate 17. A space-reserving portion 31 protrudes between the front portion 27 and the rear portion 29 in the opposite direction of the depressed direction of the depressed portion 15. An upper side coupling portion 33 is coupled to, for example by welding to the vertical plate 19 along the front portion 27, space-reserving portion 31, and rear portion 29. A lower side coupling portion 35 is downwardly bent from the space-reserving portion 31 and is coupled, for example by welding to the flange 21 of the bottom plate 17.

A head portion 39 of a mounting bolt 37 is placed between the separate plate 23 and a bottom side of the front side member 7. A shank portion 41 of the mounting bolt 37 protrudes out from the bottom of the front side member 7. The upper portion of the head portion 39 of the mounting bolt 37 is inserted, for example by welding to the separate plate 23, while the lower portion of the head portion 39 is coupled, for example by welding to an upper side of the bottom plate 17 of the front side member 7.

The method of coupling the front side member 7, mounting bolt 37, and separate plate 23 is carried out by the steps of: inserting the mounting bolt 37, for example by welding to the first side member 9; coupling, for example by welding, the separate plate 23 to the first side member 9 and the mounting bolt 37; and coupling the second side member 11 to the first side member 9.

Figure 4:
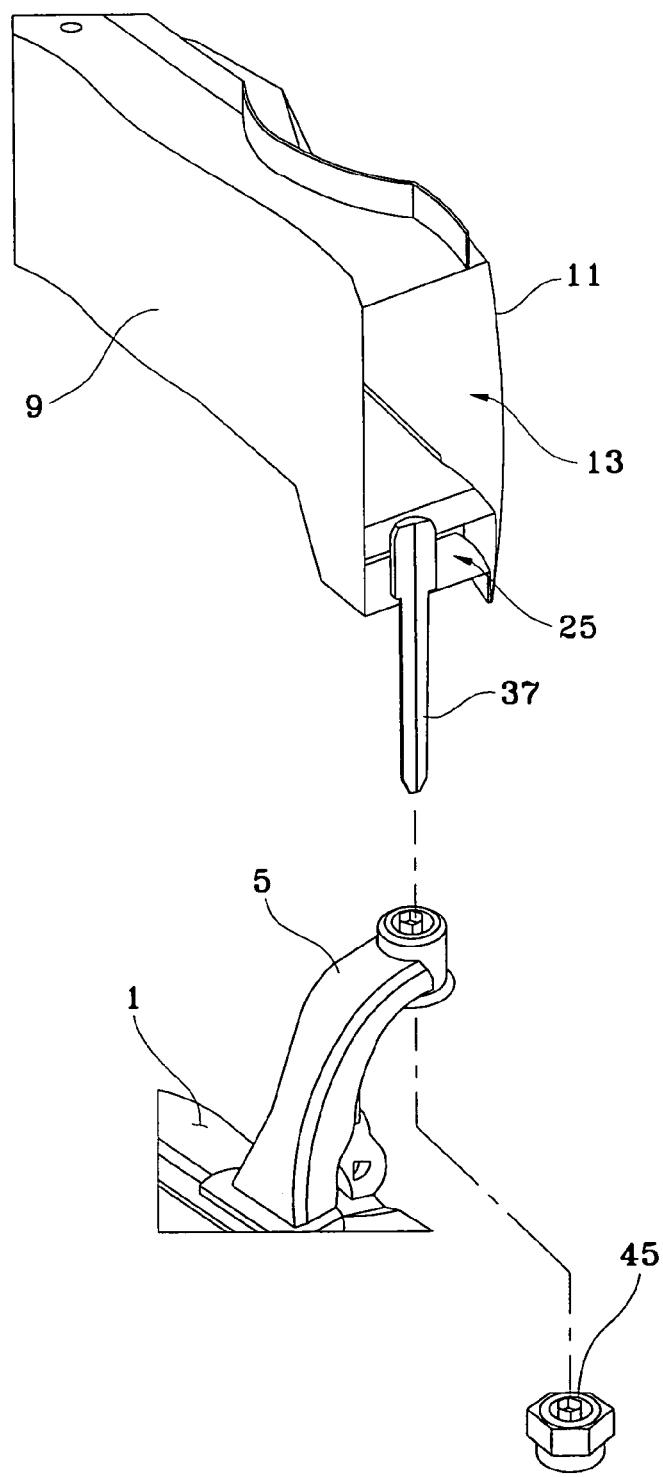
FIGS. 4 and 5 illustrate an installation processes of a center support to a front side member according to an embodiment of the present invention.
Figure 5:
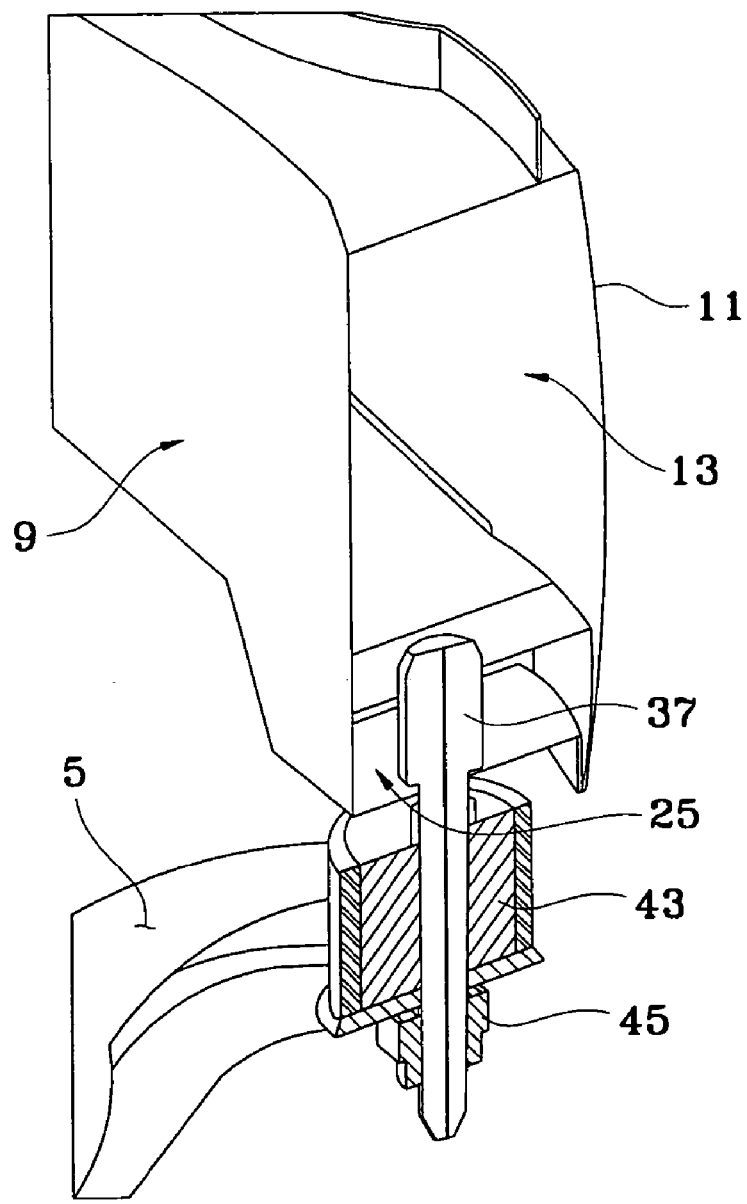

The center support 5 of the sub-frame 1 is mounted to the front side member 7 through the processes illustrated in FIGS. 4 and 5. When the shank portion 41 is inserted into a bushing 43 of the center support 5, a nut 45 is assembled thereunder to secure the center support 5 at a bottom of the front side member 7. As the mounting bolt 37 is inserted into the bushing 43 of the center support 5, the sub-frame 1 can accurately and facilely couple to the vehicle body without recourse to a separate jig.

There is an advantage in the sub-frame mounting structure for a vehicle constructed as described above in that closed sections doubled by the first and second closed sections 13 and 25 provide an appropriate supporting rigidity in relation to applied force through the center support 5, thus minimizing a deformation of the coupling portion thereof while the vehicle makes a sudden stop or a sharp turn, and reducing harshness. As apparent from the foregoing, another advantage is that the coupling portion between the center support and front side member of the sub-frame provides a sufficient rigidity and installation of the sub-frame to the vehicle body is simplified, resulting in a facilitation of the vehicle assembly.

What is claimed is:

1. A sub-frame mounting structure for a vehicle, the structure comprising:
   a front side member forming a first closed section therein and having a depressed portion at a bottom side thereof;
   a separating plate covering the upper side of said depressed portion in said front side member and forming a second closed section with said depressed portion in said first closed section; and
   a mounting bolt with a head portion disposed, by welding, between said separating plate and the bottom side of said front side member, and a shank portion protruding out from the bottom side of said front side member.

2. The structure as defined in claim 1, wherein said front side member comprises:
   a first side member including a bottom plate with said depressed portion, a vertical plate upwardly connected to one side of said bottom plate and a flange downwardly connected to the other side of said bottom plate; and
   a second side member coupling to said first side member along a longitudinal direction of the vehicle and forming said first closed section with said first side member.

3. The structure as defined in claim 2, wherein said separating plate comprises:
   a front portion and a rear portion respectively being welded to the front and back side of said bottom plate;
   a space-reserving portion protruding between said front portion and said rear portion in the opposite direction of the depressed direction of said depressed portion;
   an upper side coupling portion being welded to said vertical plate along said front portion, space-reserving portion and rear portion; and
   a lower side coupling portion being downwardly bent from said space-reserving portion and welding to said flange of said bottom plate.

4. The structure as defined in claim 1, wherein an upper portion of said head portion is inserted by welding to said separate plate; and
   a lower portion of said head portion being welded to an upper side of said front side member.

5. A sub-frame mounting structure for a vehicle, the structure comprising:
   a front side member forming a first closed section therein and having a depressed portion at a bottom side thereof;
   a separating plate covering the upper side of said depressed portion in said front side member and forming a second closed section with said depressed portion in said first closed section; and
   a mounting bolt with a head portion coupled to said separating plate and the bottom side of said front side member, and a shank portion protruding out from the bottom side of said front side member.

6. The structure as defined in claim 1, wherein said front side member comprises:
   a first side member including a bottom plate with said depressed portion, a vertical plate upwardly connected to one side of said bottom plate and a flange downwardly connected to the other side of said bottom plate; and
   a second side member coupling to said first side member along a longitudinal direction of the vehicle and forming said first closed section with said first side member.

7. The structure as defined in claim 2, wherein said separating plate comprises:
   a front portion and a rear portion respectively coupled to the front and back side of said bottom plate;
   a space-reserving portion protruding between said front portion and said rear portion in the opposite direction of the depressed direction of said depressed portion;
   an upper side coupling portion being coupled to said vertical plate along said front portion, space-reserving portion and rear portion; and
   a lower side coupling portion being downwardly bent from said space-reserving portion and coupled to said flange of said bottom plate.

8. The structure as defined in claim 1, wherein an upper portion of said head portion is coupled to said separate plate; and
   a lower portion of said head portion being coupled to an upper side of said front side member.

\* \* \* \* \*